Dec. 8, 1925.

A. NUTT ET AL 1,565,100

AUTOMATIC THROTTLE CONTROL

Filed Jan. 10, 1921  2 Sheets-Sheet 1

Inventors
ARTHUR NUTT & ADOLPH MOSES.
By their Attorney
Wm. E. Falk Jr.

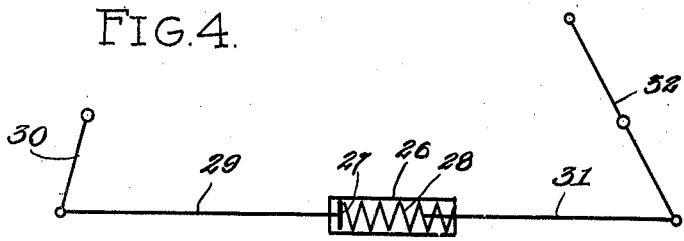
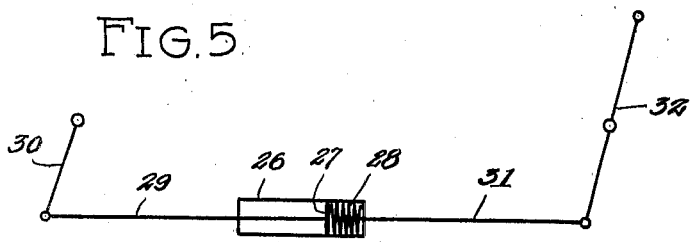
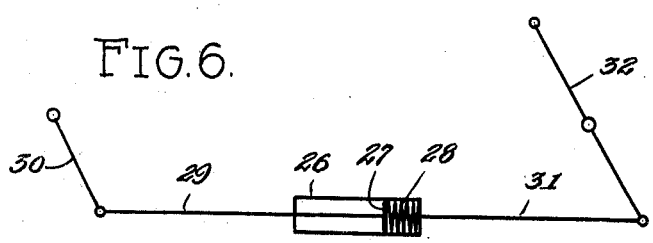
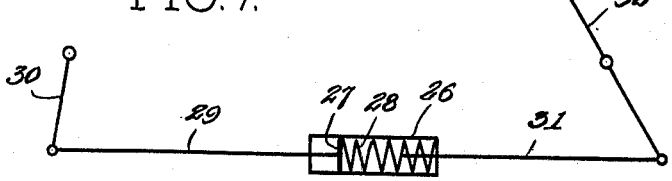

Patented Dec. 8, 1925.

1,565,100

UNITED STATES PATENT OFFICE.

ARTHUR NUTT, OF MINEOLA, AND ADOLPH MOSES, OF HEMPSTEAD, NEW YORK, ASSIGNORS, BY MESNE ASSIGNMENTS, TO CURTISS AEROPLANE AND MOTOR COMPANY, INC., OF GARDEN CITY, NEW YORK, A CORPORATION OF NEW YORK.

AUTOMATIC THROTTLE CONTROL.

Application filed January 10, 1921. Serial No. 436,291.

*To all whom it may concern:*

Be it known that we, ARTHUR NUTT and ADOLPH MOSES, citizens of the United States, residing at Mineola and Hempstead, respectively, in the county of Nassau and State of New York, have invented certain new and useful Improvements in Automatic Throttle Controls, of which the following is a specification.

Our invention relates to improvements in automatic control devices for prime movers and more particularly to improvements in automatic throttling devices for internal combustion motors.

The invention is chiefly characterized in that provision is made, 1st, for an automatic adjustment of the throttle in response to changes in the speed of operation of the motor; 2nd, for an automatic closure of the throttle (during normal operation) should the oil pressure of the motor lubrication system fall below a predetermined safe pressure; and 3rd, for manual adjustment of the throttle to regulate the speed of the motor, such manual adjustment in no way affecting the operativeness of the automatic throttle closing means.

The advantages of an invention thus characterized are as follows: A predetermined motor operating speed can be automatically maintained; acceleration of the motor beyond such predetermined maximum speed can under no circumstances be effected; an automatic and complete throttling of the motor occurs the moment the oil pressure abnormally falls off; and manual adjustment of the throttle is possible under all operating conditions except in starting and where an attempt is made to accelerate the motor speed beyond the predetermined maximum. The device consists essentially of a throttle for regulating the speed of the motor, mechanism connected with the throttle for holding the throttle in a predetermined adjusted position so long as the oil pressure of the lubrication system remains normal, and means operable automatically should the oil pressure fall below a predetermined safe pressure to actuate such mechanism and automatically close the throttle. The automatic means operates either directly in response to variations in pressure of the lubrication system or in response to changes in the speed of operation of the motor. Accordingly, a double factor of safety is established and continued operation of the motor, should the oil pressure fall off, is prevented.

Other characteristics and advantages of the invention will be hereinafter pointed out.

Figure 1:
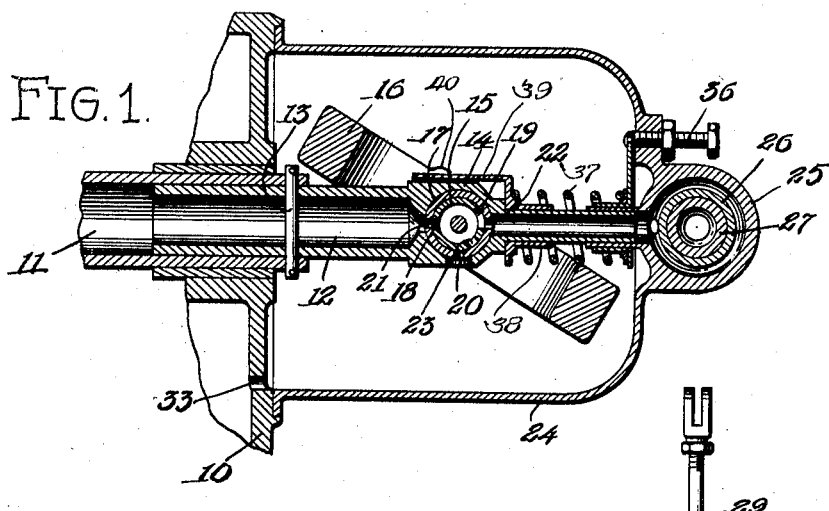
Figure 2:
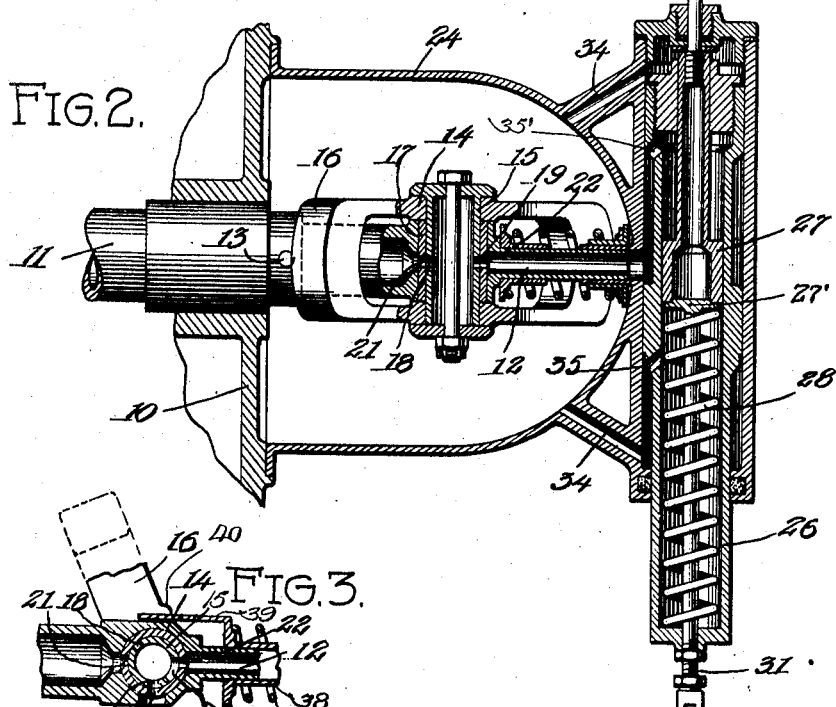
Figure 3:
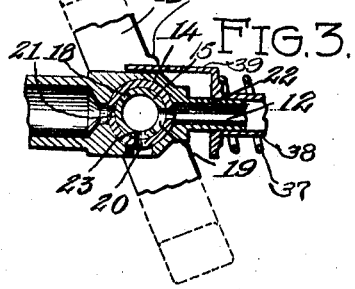

In the drawings, wherein like reference numerals designate like or corresponding parts, Fig. 1 is a longitudinal sectional view of the automatic throttling device showing the governor, forming a part of the device, in a position providing for the unobstructed passage of oil from the lubricant circuit to the cylinder forming a part of the throttle adjusting mechanism;

Fig. 2 is a sectional view taken at right angles to the section of Fig. 1;

Fig. 3 is a fragmentary view showing, in dotted lines, the position of the governor should the speed of the motor be accelerated beyond the predetermined maximum speed, in which event the oil pressure of the lubricant contained in the cylinder falls off; and Figs. 4 to 7 inclusive, illustrate diagrammatically the various positions of the throttle, throttle control lever and throttle operating mechanism.

In the embodiment of the invention selected for illustration, the motor crank case, only a portion of which is shown, is designated as 10. The cam shaft 11, which is hollow, is journalled at one end in the crank case and (as shown) is provided with a hollow cam shaft extension 12. The relation of the cam shaft extension to the cam shaft is such that the two rotate together, a pin 13 affording a suitable rigid connection therebetween. Intermediately of its ends the cam shaft extension 12 is enlarged as at 14 to receive the spindle 15 of a centrifugal governor 16. Such spindle 15 together with a sleeve 17 likewise enclosed in the enlargement 14 of the cam shaft extension constitutes a sleeve valve. Both the spindle 15 and the sleeve 17 are provided with ports, the ports of the spindle being designated respectively as 18, 19 and 20 and the ports of the sleeve as 21, 22 and 23. The sleeve is at all times fixed relatively to the cam shaft extension, whereas the spindle is mounted to rotate, its rotation being governed by movement of the centrifugal governor 16. The governor (see Fig. 2) being directly carried by the cam shaft extension rotates with the cam shaft, and as the speed of the cam shaft increases, the governor due to centrifugal force, moves from the full line position indicated in Fig. 1 to the position indicated in Fig. 3, such movement providing for the opening and closing of the sleeve valve.

As a protection for the governor, and as a support for the extended end of the cam shaft extension 12, a suitable casing 24 is provided. At its outer end the casing 24 is in turn provided with a cylinder structure 25 within which the throttle operating mechanism is contained. Being integrally formed with the governor casing 24, the cylinder structure 25 is incapable of relative movement.

The cylinder structure 25, in the operation of the throttling device functions as a guide or container within which a movable cylinder 26 and piston 27 are enclosed. In addition to the piston 27 a spring 28 is enclosed in the cylinder 26. As hereinafter more fully pointed out, the cylinder 26 and piston 27, under certain operating conditions are adapted to move as a unit, whereas under other and different operating conditions either is capable of movement relatively to the other. The piston 27, by means of a rod 29 is directly connected with a throttle 30. Accordingly as the piston 27 moves, the throttle 30 moves with it. The cylinder 26, unlike the piston 27, is directly connected by means of a rod 31 with a throttle control lever 32, the rods 29 and 31 together with the cylinder and piston affording the connection between the throttle control lever and the throttle. Such connection, under certain operating conditions may be described as a rigid connection, whereas under other and different operation conditions, the connection is in every sense non-rigid. The spring 28, enclosed in the cylinder 26, bears on the piston 27 and on one end of the cylinder chamber. Its function will be hereinafter explained.

In Figs. 1 and 2 of the drawings, it will be noted, that the hollow cam shaft extension 12, when the sleeve valve is positioned as indicated, serves as an oil duct through which oil is admitted to the cylinder 26 from the cam shaft. By thus admitting oil to the cylinder the oil pressure therein, during normal operation of the motor, equals the oil pressure of the lubrication circuit. Such oil pressure, when normal, is sufficient to overcome the action of the spring 28.

Referring now to the diagrammatic illustrations of Figures 4 to 7 inclusive, Figure 4 illustrates the position of the throttle and of the throttle control lever when the motor is not running. Due to the absence of oil pressure in the cylinder 26, and as a direct result of the expansion of the spring 28, the throttle 30 is closed i. e. fully retarded and the throttle control lever 32 is in what we prefer to designate an "open" or advanced position. Preferably the throttle and the throttle control lever are so mounted that greater frictional resistance must be overcome in moving the throttle control lever than must be overcome in moving the throttle. So long as the connection between the throttle and the throttle control lever is characterized by an absence of oil pressure, or by a sub-normal oil pressure, in the cylinder 26, the connection is, in effect, non-rigid.

In Figure 5, which illustrates the position of the throttle and the throttle control lever in starting or when idling, it will be noted that the position of both the throttle 30 and the piston 27 is the same as in Figure 4. The throttle control lever 32, however, has been manually adjusted to fully compress the spring 28 by movement of the cylinder 26 bodily relatively to the piston 27 and to the cylinder structure 25 (not shown in the diagrammatic illustrations). With the piston 27 and the cylinder 26 thus positioned, and the motor started, the oil contained in the lubrication circuit enters the cylinder 26 by way of a port 35' (see Figure 2) and as the motor continues to operate, builds up a pressure behind the piston 27 to an extent more than sufficient to counteract the expanding tendency of the spring 28. In this manner the spring is held in a compressed position so long as the oil pressure in the oil circuit (and hence in the cylinder 26) remains normal and the speed of the motor does not exceed a predetermined speed; i. e., a speed sufficient to cause the governor 16 to actuate the sleeve valve and permit exhaust of the oil contained in the cylinder. With the oil pressure normal and the motor speed normal, the piston 27 and the cylinder 26 are incapable of relative movement, though movement of the cylinder 26 and hence the piston, relatively to the cylinder structure 25, can be effected by manual adjustment of the throttle control lever 32. In other words, that which was originally a "non-rigid" connection between the throttle and the throttle control lever is made (by the oil pressure in the cylinder 26) in effect "rigid." Being rigid, obviously such manual adjustment as may be accorded the throttle control lever is simultaneously transmitted by reason of the rigid connection to the throttle. In fact, in moving the throttle control lever from an "open" position to the position which we prefer to designate as "closed," the inner end of the rod 31 (the latter being rigid with the cylinder 26) bears directly on the piston.

Fig. 6 illustrates the position of the parts comprising the connection between the throttle and throttle control lever, the throttle control lever having been manually opened to accelerate the operating speed of the motor. Here again the pressure of the oil contained in the cylinder is sufficient to counteract the expanding tendency of the spring.

In Fig. 7 the throttle is shown partly closed, such closure being brought about automatically as a result of either of two causes. Should the pressure in the lubrication circuit fall below a predetermined safe pressure the pressure naturally falls off behind the piston, such decrease of pressure within the cylinder 26 permitting the spring 28 to expand regardless of the operating speed of the motor. The expansion of the spring automatically closes the throttle as a result of the rigid connection between the piston and throttle afforded by the rod 29. The other condition under which the throttle is automatically closed is brought about by an acceleration of the motor beyond the predetermined maximum speed for which the automatic throttle device is designed or adjusted. In this latter instance the rise and fall of oil pressure in the cylinder 26 is controlled by the action of the governor 16. Should the motor, for any cause, attain a speed higher than the predetermined maximum speed, the governor, due to centrifugal force, moves to the position indicated in Fig. 3. The spindle 15, being rigid with the governor turns as the governor moves, such turning movement of the spindle shutting off the admission of oil to the cylinder 26, and, as a result of the movement of the ports 18, 20, 21 and 23 respectively, into and out of registration, a discharge or back flow of the lubricant contained in the cylinder is permitted. As the oil in the cylinder is discharged the pressure behind the piston 27 falls off. Accordingly as before, the spring 28 is free to expand and automatically close the throttle.

To provide for the return of the oil again to the lubrication circuit an opening 33 is formed in the crank case in line with the base of the governor casing 24. The oil in passing out through the port 23 of the sleeve 17 is free to enter the opening 33. To take care of such oil as might pass beyond the ends of the cylinder 26 and into the cylinder structure, as well as such oil as might enter on the wrong side of the piston, ports 34 and 35 are formed respectively in the cylinder structure 25 and the cylinder 26; such oil (after passing through the casing 24) being again admitted to the lubrication circuit by way of the opening 33. To provide for a variation in the setting of the governor, suitable conventional adjusting means designated herein as 36 may be provided.

The adjusting mechanism 36 in the embodiment illustrated, comprises a spring 37, a sleeve 38, and a sleeve extension 39. The spring at one end bears against the sleeve extension 39 and the latter, viewed from the top, extends laterally to bear against lugs 40 formed on the centrifugal governor. Accordingly it will be observed that as the governor, due to centrifugal force, moves toward a vertical position the contact between the lugs 40 and the sleeve extension 39 will cause the sleeve 38 to compress the spring 37 in direct proportion to the extent of movement accorded the governor. The thumb nut and screw, by adjustment, will suffice to regulate the tension of the spring.

It will be further observed that the rod 31 which affords the desired rigid connection between the cylinder 26 and the throttle control lever 32 is extended well into the cylinder and at its inner end bears directly on a cap 27' which forms a part of the piston 27. By thus extending the rod 31 into the cylinder a rigid connection between the throttle control lever and the throttle is obtained when the spring 28 is fully compressed.

In conclusion, it may be noted that the automatic governor device may be connected up with a part of the motor other than the cam shaft. It is only essential that the oil pressure of the lubrication circuit be controlled in its admission and discharge to and from the cylinder 26. The device, however, is especially suited to internal combustion motors having a lubrication system operating on the forced feed plan.

While we have described our invention in detail in its present preferred embodiment, it will be obvious to those skilled in the art after understanding our invention, that various changes and modifications may be made therein without departing from the spirit or scope thereof. We aim in the appended claims to cover all such modifications and changes.

What is claimed is:

1. The combination, in a throttling device for internal combustion motors, of a throttle, a throttle control lever, a bodily movable mechanical connection between the throttle and throttle control lever including parts capable of relative movement, and means for temporarily so relating such parts as to render them incapable of relative movement without affecting in any way the bodily movement thereof.

2. The combination with an internal combustion motor including a pressure feed lubrication system, of a speed regulating device for the motor comprising a throttle, a throttle control lever, a mechanical connection between the throttle and the throttle control lever having incorporated therein relatively movable parts, which parts, so long as the oil pressure in the lubrication system remains normal, are capable of bodily movement but are incapable of relative movement, and means associated with said relatively movable parts for automatically relatively moving said parts should the oil pressure fall below normal, said parts, when rendered incapable of relative movement affording a rigid bodily movable connection between the throttle and the throttle control lever whereby manual adjustments accorded said throttle control lever are directly transmitted to said throttle, and said parts when rendered capable of relative movement, affording a non-rigid connection between said throttle and said throttle control lever whereby the movements accorded the throttle control lever affect in no way the adjusted position of the throttle.

3. The combination with an internal combustion motor including a pressure feed lubrication system, of a speed regulating device for the motor comprising a throttle, a throttle control lever, a mechanical connection between the throttle and the throttle control lever, having incorporated therein relatively movable parts, which parts, so long as the oil pressure in the lubrication system remains normal, are incapable of relative movement, means associated with said relatively movable parts for automatically relatively moving said parts should the oil pressure fall below normal, said parts, when rendered incapable of relative movement affording a rigid connection between the throttle and the throttle control lever, and when rendered capable of relative movement affording a non-rigid connection between said throttle and said throttle control lever, and a governor driven by the motor and operatively associated with said movable parts for controlling the movement thereof.

4. The combination with an internal combustion motor including a pressure feed lubrication system, of a speed regulating device for the motor comprising a throttle, a throttle control lever, said throttle control lever being so mounted as to require that a greater amount of operative force be exerted thereon to effect its adjustment than is required to effect adjustment of the throttle, a mechanical connection between the throttle and the throttle control lever, having incorporated therein a relatively movable cylinder and piston, which cylinder and piston, so long as the oil pressure in the lubrication system remains normal are incapable of relative movement, a fixed cylinder through which said connection passes, said fixed cylinder being open to the lubrication system for admitting oil under pressure to said fixed cylinder, means carried by the motor for controlling the admission and exhaust of the oil to and from said fixed cylinder according to the operating speed of the motor, and means associated with said relatively movable parts for automatically moving said parts should the oil pressure admitted to said cylinder fall below normal, said parts when rendered incapable of relative movement affording a rigid connection between the throttle and the throttle control lever, whereby the manual adjustments accorded said throttle control lever are directly transmitted to said throttle, and said parts when rendered capable of relative movement affording a non-rigid connection between said throttle and said throttle control lever whereby movement of the throttle, independently of the throttle control lever, due to the increased frictional resistance, may be automatically effected.

5. In an automatic throttling device, the combination with an internal combustion motor including a hollow shaft through which oil is adapted to be circulated under pressure, of a hollow extension formed upon one end of the shaft and rotatable with it, a throttle control lever, a throttle, a connection between the throttle control lever and the throttle including a cylinder and piston, a spring inclosed in the cylinder and bearing at one end on the piston, a fixed cylinder structure into which both the cylinder and the piston extend, a valve carried by the shaft extension, an automatic means for opening and closing said valve according to the operating speed of the motor to control the admission and exhaust of the oil contained in the lubrication circuit respectively to and from said cylinder, the pressure of the oil admitted to the cylinder, during normal operation of the motor, being sufficient to overcome the expanding tendency of said spring.

In testimony whereof we hereunto affix our signatures.

ARTHUR NUTT.
ADOLPH MOSES.